United States Patent
Persson et al.

(10) Patent No.: US 8,184,431 B2
(45) Date of Patent: May 22, 2012

(54) METHODS OF PRODUCING A HOUSING OF A PORTABLE ELECTRONIC DEVICE AND A HOUSING PORTION OF A PORTABLE ELECTRONIC DEVICE

(75) Inventors: Marten Carl Ingvar Persson, Lund (SE); Peter Hans Wilhelm Estlander, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 232 days.

(21) Appl. No.: 12/648,973

(22) Filed: Dec. 29, 2009

(65) Prior Publication Data
US 2011/0134589 A1 Jun. 9, 2011

Related U.S. Application Data

(60) Provisional application No. 61/266,640, filed on Dec. 4, 2009.

(51) Int. Cl.
*G06F 1/16* (2006.01)
(52) U.S. Cl. .......... 361/679.01; 248/689; 206/229; 200/296; 604/135
(58) Field of Classification Search .......... 248/346.03, 248/118, 689, 125.8; 361/679.09, 679.27, 361/679.55, 679.26, 679.19, 679.34; 312/223.2, 312/204; 206/443, 763, 387.1, 229; 604/195, 604/111, 135; 200/5 A, 344, 296
See application file for complete search history.

(56) References Cited

U.S. PATENT DOCUMENTS

| | | | |
|---|---|---|---|
| 2004/0016628 A1* | 1/2004 | Hochgesang et al. | 200/5 A |
| 2006/0006168 A1* | 1/2006 | Rock et al. | 219/545 |
| 2008/0316685 A1 | 12/2008 | Chen et al. | |
| 2009/0090162 A1 | 4/2009 | Bradley et al. | |

FOREIGN PATENT DOCUMENTS

FR 2 045 739 A1 3/1971

OTHER PUBLICATIONS

International Search Report Corresponding to International Application No. PCT/EP2010/066831; Date of Mailing: Mar. 21, 2011; 3 pages.

* cited by examiner

*Primary Examiner* — Hung Duong
(74) *Attorney, Agent, or Firm* — Myers Bigel Sibley & Sajovec, P.A.

(57) ABSTRACT

A method of producing a housing of a portable electronic device comprising at least two portions is provided. The method comprises the steps of providing a first housing portion layer made from sheet metal, providing a second housing portion layer made from a plastic material, forming a first housing portion from the first housing portion layer using a high speed forming process, and joining the first housing portion layer with the second housing portion layer. A housing of a portable electronic device manufactured in accordance with the method is also provided.

18 Claims, 3 Drawing Sheets

METHODS OF PRODUCING A HOUSING OF A PORTABLE ELECTRONIC DEVICE AND A HOUSING PORTION OF A PORTABLE ELECTRONIC DEVICE

CLAIM OF PRIORITY

The present application claims priority from U.S. Provisional Patent Application No. 61/266,640, filed Dec. 4, 2009, the disclosure of which is hereby incorporated by reference herein in its entirety.

FIELD

The present invention relates to portable electronic devices, and more particularly, to methods of producing a housing portion of a portable electronic device and related devices.

BACKGROUND

Portable electronic devices such as mobile telephones, laptop computers, music players, personal digital assistants and GPS devices may be provided with a housing inside which inter alia electronic components are arranged. The housing often comprises various buttons such as keypads and navigation buttons. In the housing of a portable electronic device there is often mounted a display. It is also common that the housing is provided with one or more connection sockets for connecting e.g. a battery charger, headphones, memory devices, etc.

Housing portions such as body shells, body shell parts, lids and buttons of portable electronic devices may be manufactured from a plastic material or from a metal. Plastic materials may have an advantage in that they may be cheap and easily formed into desired shapes whereas they may have inferior wear properties. Metallic materials may have greater resistance to wear than plastic materials whereas forming may be more difficult than with plastic materials. Metal housing portions may also have a higher weight than a plastic housing portion of similar size.

Housing portions may be also manufactured from a combination of a plastic material and a metal, i.e. a housing portion may comprise a plastic layer and a metal layer. For instance an outer layer of a housing portion may be formed by a metal layer, which may be supported by an inner plastic layer. The outer metal layer may provide a wear resistant, robust and exclusive feel to a particular housing portion.

The metal layer of a housing portion may be shaped in a pressing operation using a mechanical or hydraulic press. Also an outer texture or surface profile of the metal layer may be shaped in the pressing operation. However, finer surface textures may be achieved in a subsequent cutting operation, such as a milling or grinding operation.

SUMMARY

According to some embodiments, a method of producing a housing of a portable electronic device comprising at least two portions includes: providing a first housing portion layer made from sheet metal; providing a second housing portion layer made from a plastic material, forming a first housing portion from the first housing portion layer using a high speed forming process; and joining the first housing portion layer with the second housing portion layer.

The first housing portion layer made from sheet metal may comprise two different metal layers, e.g., a thin outer metal layer which may have an exclusive look and an inner metal layer which may be relatively cheap and/or may have other desired properties such as high conductivity and/or may be easily formed. For instance, the outer layer may comprise stainless steel, silver, and/or gold, and the inner layer may comprise aluminium copper, and/or iron. The inner and outer metal layers may be joined during the high speed forming process, or they may be provided pre-joined prior to the high speed forming process.

Since the high speed forming process may be used to form the first housing portion made from sheet metal, relatively high accuracy in forming the sheet metal may be achieved. High speed forming may also be referred to herein as high velocity forming. Such high speed/velocity forming processes may include, inter alia, electromagnetic forming processes, electro hydraulic forming processes, and explosive forming processes (for example, using high explosives or combustible gases). If desired, a fine surface texture may be achieved in forming the first housing portion by providing a correspondingly detailed surface in a die, into which the first housing portion layer is driven. The fine surface textures of the first housing portion may thus be achieved in one forming step. If desired, the surface texture may be made to contain extremely fine details.

According to example embodiments, forming the first housing, portion may include driving the sheet metal layer into a die provided with indentations and/or protrusions, with a surface of the first housing portion forming an external surface of the housing abutting the die. The indentations and/or protrusions may be utilized to form surface textures on the surface of the first housing portion.

According to example embodiments, joining the first housing portion layer with the second housing portion layer may be performed after forming the first housing portion.

According to example embodiments, joining the first housing portion layer with the second housing portion layer may be performed during forming the first housing portion. In this manner, a housing portion comprising two layers may be formed in one step.

According to example embodiments, joining the first housing portion layer with the second housing portion layer may be performed before forming the first housing portion. In this manner, pre-joined two layer housing portion blanks may be used in the method.

According to example embodiments, joining the first housing portion layer with the second housing portion layer may include any one of gluing, taping, chemical bonding, and/or moulding.

According to example embodiments, the method may include heating the second housing portion layer. Such heating may be performed before, during, or after forming the first housing portion. By heating the second housing portion layer plastic material, it may be shaped. For instance, the shaping may be performed to fit the first housing portion layer once it has be shaped in forming the first housing portion, or to shape at least a part of the second housing portion layer independently of the first housing portion layer, or to bond or mould the second housing portion layer to the first housing portion layer.

According to example embodiments, the method may include providing the second housing portion layer with holes therein adapted for connecting a further housing portion of the portable electronic device. Such step may be performed separately from forming the first housing portion or during forming the first housing portion. Optionally, the step may be performed during heating the second housing portion layer.

According to example embodiments, there may be provided a further housing portion layer, e.g. in the form of a second metal layer. Such a second metal layer may also be shaped in forming the first housing portion.

According to example embodiments, the method may include laser cutting through the first housing portion layer to provide openings in the first housing portion layer. Such openings may be made precise and narrow if so required. For instance, openings permitting the passage of internal lighting of a portable electronic device may be created in this manner.

According to example embodiments, the first housing portion layer may have a thickness of about 0.05 to about 1.0 mm. First housing portion layers that are relatively thin, e.g. having a thickness of about 0.05 to about 0.2 mm, may benefit from being joined with the second housing portion layer before or during forming the first housing portion.

According to example embodiments, forming the first housing portion may include forming a three dimensional pattern surface texture on the surface of the first housing portion layer.

According to example embodiments, the high speed forming process may be an electromagnetic forming process. Electromagnetic forming may be an easily reproducible form of high speed forming. Thus, manufacturing of high numbers of housing portions may be performed. The term electromagnetic forming is understood to encompass electromagnetic pulse forming.

For the electromagnetic forming process, the first housing portion layer may be arranged between a die and a coil. Optionally, the second housing portion layer may also be arranged between the die and the coil. The die may be provided with indentations and/or protrusions to shape the first housing portion layer as desired.

According to example embodiments, forming may include providing a separate driver plate made from metal, the driver plate being accelerated during the electromagnetic forming. The driver plate may not form part of the housing portion produced, but rather, may be part of the production equipment used.

According to example embodiments, the driver plate may be arranged next to the second housing portion layer during forming of the first housing portion. In this manner, the first housing portion layer and the second housing portion layer may both be driven in a direction of a die.

According to example embodiments, a surface of the driver plate may be provided with indentations and/or protrusions. Such indentations and/or protrusions may shape a layer adjacent to the driver plate, e.g. the first housing portion layer or the second housing portion layer, during the high speed forming process.

According to example embodiments, the high speed forming process may be an electro hydraulic forming process. Electro hydraulic forming may be an easily reproducible form of high speed forming. Thus, manufacturing of high numbers of housing portions may be performed.

According to example embodiments, the electromagnetic forming process may include evacuating a volume formed between the first housing portion layer and a die. In this manner, little or no gas may be present between the first housing portion layer and the die when the first housing portion layer is driven into the die.

A housing portion of a portable electronic device may be manufactured in accordance with any aspects of the example embodiments mentioned above.

Further features of, and advantages with, the present invention will become apparent when studying the appended claims and the following description. Those skilled in the art will realize that different features of the present invention may be combined to create embodiments other than those described in the following, without departing from the scope of the present invention, as defined by the appended claims.

BRIEF DESCRIPTION OF THE DRAWINGS

The various aspects, including particular features and advantages, will be readily understood from the following detailed description and the accompanying drawings, in which.

DETAILED DESCRIPTION OF EMBODIMENTS

Example embodiments will now be described more fully with reference to the accompanying drawings. This invention should not be construed as limited to the embodiments set forth herein. Disclosed features of the example embodiments may be combined as readily understood by one of ordinary skill in the art. Like numbers refer to like elements throughout. Well-known functions or constructions may not be described in detail for brevity and/or clarity.

The verbs "form," "shape," "forming," and "shaping" are used interchangeably herein and are to be interpreted as changing or adapting a shape of an element.

Figure 1:
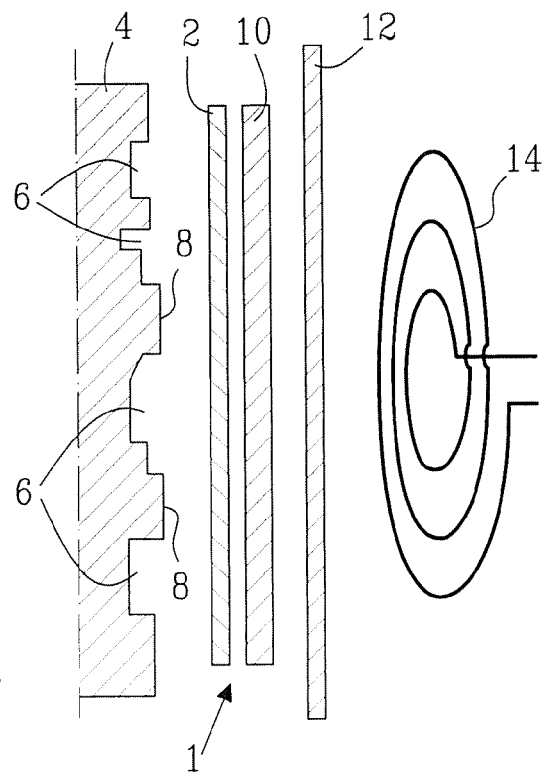
FIG. 1 illustrates schematically two separate housing portion layers set up to produce a housing portion.

FIG. 1 illustrates schematically two separate housing portion layers set up to produce a housing portion 1 of a portable electronic device according to some embodiments of the present invention. A first housing portion layer 2 made from sheet metal is arranged next to a die 4. The die 4 is provided with one or more indentations 6 and protrusions 8 for shaping the first housing portion layer 2. On a side of the first housing portion layer 2 opposite to the die 4, a second housing portion layer 10 is arranged. The second housing portion layer 10 is made from a plastic material. On a side of the second housing portion layer 10 opposite to the first housing portion layer 2, a driver plate 12 is arranged.

A high speed forming process in the form of electromagnetic forming is used for forming the housing portion 1 comprising the first and second housing portion layers 2, 10. Electromagnetic forming utilizes one or more current pulses sent through a coil 14, which produces a first magnetic field around the coil 14. The first housing portion layer 2 and the driver plate 12 are arranged close to the coil 14. The first magnetic field induces a current in each of the first housing portion layer 2 and the driver plate 12, since both are metallic and thus conductive. The induced current creates in turn a second and a third magnetic field around the respective first housing portion layer 2 and the driver plate 12. The first magnetic field repels the second and third magnetic fields, and thus, the first housing portion layer 2 and the driver plate 12 are driven towards the die 4 at high speed. Due to the use of the driver plate 12 the second housing portion layer 10, in which no current is induced due to the material in the second housing portion layer 10 being plastic, is also driven towards the die 4. The driver plate 12 may have such properties that it conforms to the housing portion 1, e.g. it may be made from a soft metal such as copper or aluminium.

The first housing portion layer 2 and the second housing portion layer 10 may be joined during the high speed forming, i.e. when the first housing portion layer 2 and the second housing portion layer 10 are driven into the die 4. This may be achieved by means of a glue applied to one or both housing portion layers 2, 10 prior to them being placed between the die 4 and the driver plate 12. Alternative means for joining the first housing portion layer 2 and the second housing portion layer 10 may be to mould them together when they are driven into the die 4, e.g. one or more protrusions 8 may make the first housing portion layer 2 penetrate into the second housing portion layer 10. Moulding may be combined with the use of a bonding agent to enhance joining of the first housing portion layer 2 with the second housing portion layer 10.

Forming of the second housing portion layer 10 may be facilitated by applying heat to the second housing portion layer 10 either before, during, or after the high speed forming. Such heating of the second housing portion layer 10 may also be part of joining it to the first housing portion layer 2.

Figure 2:
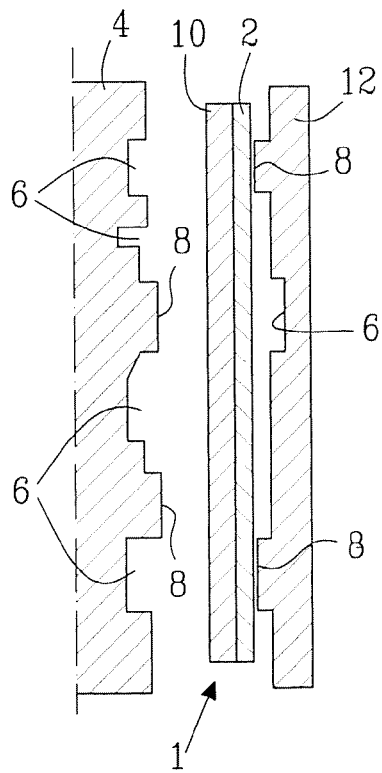
FIG. 2 illustrates schematically two pre-joined housing portion layers set up to produce a housing portion.

FIG. 2 illustrates schematically two pre-joined housing portion layers set up to produce a housing portion 1 of a portable electronic device. A first housing portion layer 2 comprising a sheet metal joined with a second housing portion layer 10 comprising a plastic material is arranged between a die 4 and a metallic driver plate 12. Again a coil (non-shown) is used for electromagnetic forming of the housing portion 1. The magnetic field from the non-shown coil acts on the driver plate 12 and the first housing portion layer 2 and drives them towards the die 4.

The die 4 as well as the driver plate 12 are provided with indentations 6 and protrusions 8 such that the first housing portion layer 2 and the second housing portion layer 10 as well as the formed housing portion 1 are shaped according to desired specifications. Again, heating of the second housing portion layer 10 may be used as mentioned above in connection with FIG. 1.

Concerning the arrangement of the first housing-portion layer 2, the second housing portion layer 10, and the driver plate 12, alternative embodiments are foreseen. With reference to FIG. 1 the first housing portion layer 2 and the second housing portion layer 10 may instead be pre-joined and with reference to FIG. 2 the layers 2, 10 may instead be separate. Which of the layers 2, 10 is arranged closest to the die 4 may be altered in the embodiments of FIG. 1 and FIG. 2. Also, the driver plates 12 in each of the embodiments illustrated in FIGS. 1 and 2 may be flat or provided with indentations 6 and protrusions 8.

In example embodiments where the second housing portion layer 10 is arranged between the die 4 and the first housing portion layer 2 made from sheet metal, the driving plate 12 may be omitted. This is applicable both when the first housing portion layer 2 and the second housing portion layer 10 are separate before high speed forming as well as when the first housing portion layer 2 and the second housing portion layer 10 are pre-joined before high speed forming.

The first housing portion layer 2 made from sheet metal may be formed by means of high speed forming separate from the second housing portion layer 10. Again a driving plate may be omitted. The first housing portion layer 2 and the second housing portion layer 10 are joined after forming of the first housing portion layer 2.

Figure 3:
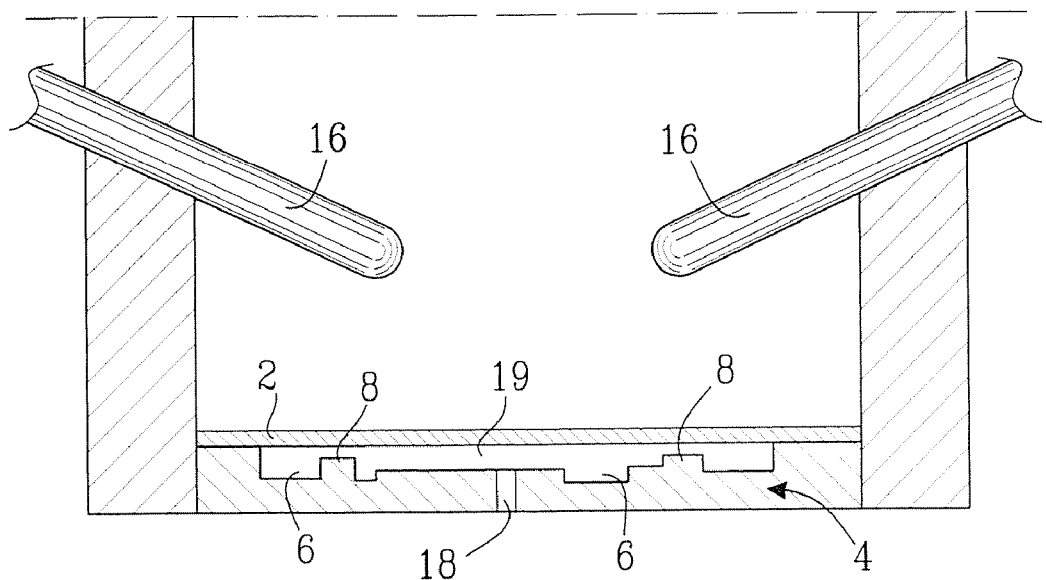
FIG. 3 illustrates schematically a setup for producing a first housing portion layer of a housing portion of a portable electronic device.

FIG. 3 illustrates schematically a setup for producing a first housing portion layer 2 of a housing portion of a portable electronic device according to further embodiments of the present invention. The first housing portion layer 2 made from sheet metal is arranged next to a die 4. The die 4 is provided with one or more indentations 6 and protrusions 8 for shaping the first housing portion layer 2. A high speed forming process in the form of electrohydraulic forming is used for forming the first housing portion layer 2. Electrohydraulic forming utilizes one or more current pulses sent between two electrodes 16 submerged in a fluid, such as water. An electric arc is formed by the current pulse/s between the electrodes 16. The electric arc rapidly vaporizes at least part of the fluid, which creates a shock wave. The first housing portion layer 2 is thus driven into the die 4 at high speed. A through hole 18 arranged in the die 4 allows gas to escape from a space 19 between the first housing portion layer 2 and the die 4. Alternatively, the space 19 may be evacuated via the through hole 18 before the current pulse/s is/are sent between the electrodes 16.

A second housing portion layer, e.g. made from a plastic material, may be joined with the first housing portion layer 2 after the electrohydraulic forming to form a housing portion of a portable electronic device. Alternatively, as explained above in connection with electromagnetic forming, the first housing portion layer 2 may be pre-joined with a second housing portion layer before the electrohydraulic forming or the first housing portion layer 2 and a second housing portion layer may be joined during the electrohydraulic forming.

Thanks to the use of high speed forming processes, e.g. electromagnetic or electrohydraulic forming, the first housing portion layer 2 may be formed accurately with fine detailing of the outer surface facing the die 4. At least some of the indentations 6 and protrusions 8 may be of detailed nature which will be reproduced on the outer surface of the first housing portion layer 2. It is possible to create three dimensional images or effects by means of finely detailed indentations and protrusions of the die 4. It is thus possible to form e.g. a hologram image on the outer surface of the first housing portion layer 2. To produce fine details on the outer surface of the first housing portion layer 2 the die 4 is provided with an area of finely detailed indentations and/or protrusions. The depth of such indentations or the height or such protrusions in the area may be in the range of wave lengths of visible light, e.g., about 380 nm-750 nm. Alternatively, the depth of such indentations or the height or such protrusions may be in the range of wave lengths of visible light up to about 0.005 mm, e.g., about 380 nm-0.005 mm. Alternatively, the depth of such indentations or the height or such protrusions may be in the range of wave lengths of visible light up to about 0.01 mm, e.g., about 380 nm-0.01 mm. Alternatively, the depth of such indentations or the height or such protrusions may be in the range of wave lengths of visible light up to about 0.1 mm, e.g., about 380 nm-0.1 mm. Such finely detailed indentations and/or protrusions may be achieved inter alia by means of laser engraving.

Figure 4:
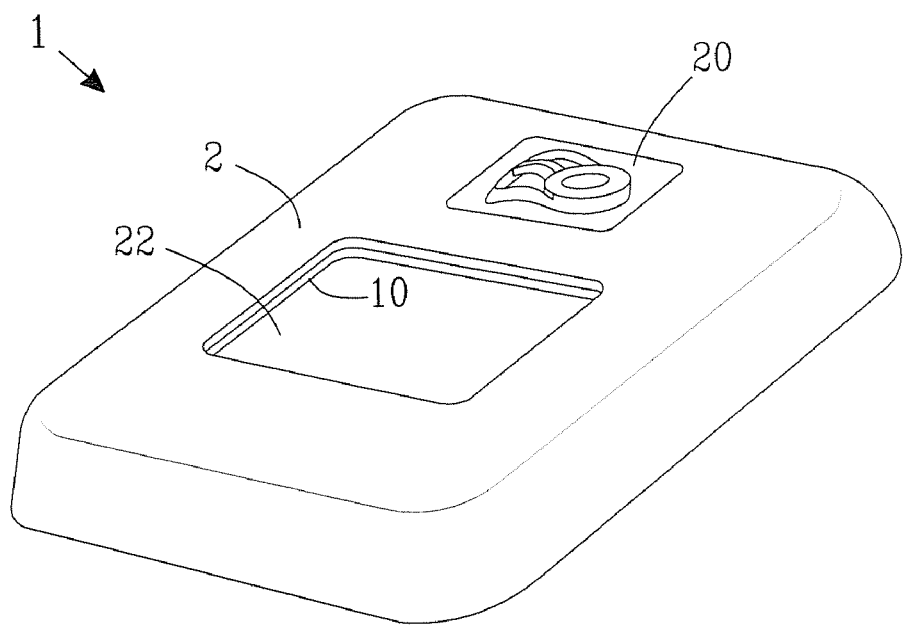
FIG. 4 illustrates a housing portion of a portable electronic device.

FIG. 4 illustrates a housing portion 1 of a portable electronic device manufactured as described above. The housing portion 1 comprises two layers, an outer first housing portion layer 2 made from sheet metal and a second housing portion layer 10 made from a plastic material. A finely detailed embossment 20, such as a three dimensional image, is arranged on an outer surface portion of the housing portion 1. The embossment 20 has been made in the high speed forming process. The housing portion 1 is provided with an opening 22, in which e.g. a display or a keypad of the portable electronic device may be arranged.

Figure 5:
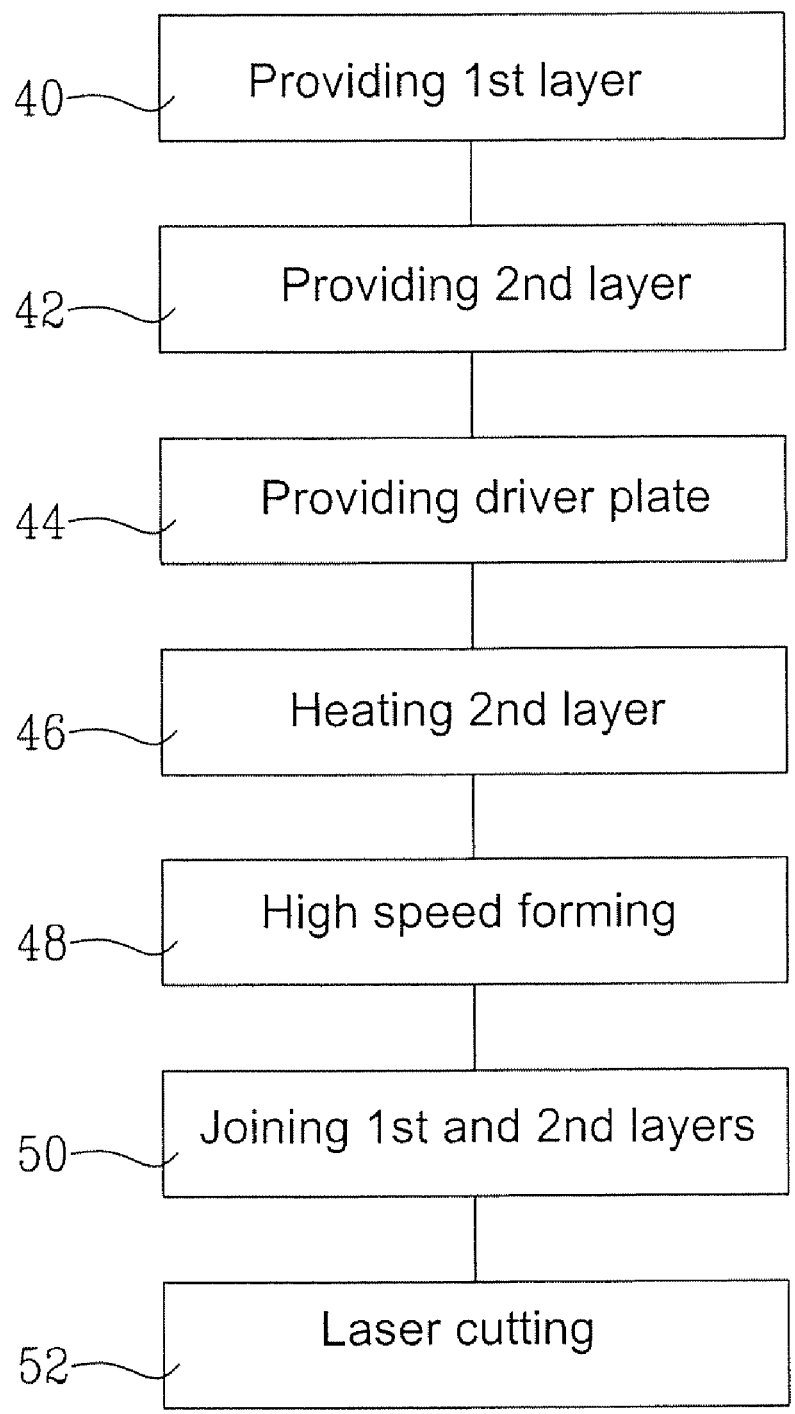
FIG. 5 illustrates example embodiments of a method of producing a housing portion comprising at least two layers.

FIG. 5 illustrates example embodiments of a method of producing a housing portion comprising at least two layers. The method may comprise the following steps.

Providing 40 a first housing portion layer made from sheet metal.

Providing 42 a second housing portion layer made from a plastic material.

An optional step of providing 44 a separate driver plate made from metal.

A further optional step of heating 46 the second housing portion layer.

Forming 48 the first housing portion layer using a high speed forming process. The high speed forming may be an electromagnetic forming process or an electro hydraulic forming process.

Joining 50 the first housing portion layer with the second housing portion layer.

A further optional step of laser cutting 52 through the first housing portion layer to provide openings in the first housing portion layer.

It is to be understood that, if used, the driver plate is accelerated during the electromagnetic forming. Also, in some embodiments, the operations of FIG. 5 may be performed in a different order. For instance the joining step 50 may be performed before the two, or three, providing steps 40, 42, 44.

The first and/or the second housing portion layers may be cut to shape before they are provided for high speed forming. Alternatively, they may be cut to shape after high speed forming. It is foreseen that more than one housing portion may be formed in one high speed forming step. The multiple housing portions may be separated from each other after the high speed forming process.

Concerning the example embodiments, many different alterations, modifications and the like will become apparent for those skilled in the art. The first housing portion layer 2 made from sheet metal has in the foregoing been described as forming an outer layer of the housing portion 1 of a portable electronic device. It is of course equally possible to use the second housing portion layer 10 as the outer layer of the housing portion 1 of a portable electronic device.

Therefore, it is to be understood that the foregoing is illustrative of various example embodiments and is not to be limited to the specific embodiments disclosed and that modifications to the disclosed embodiments, combinations of features of disclosed embodiments as well as other embodiments are intended to be included within the scope of the appended claims. The term "housing portion" is to be interpreted in a broad sense covering actual housing portions as well as buttons, keypads, navigation buttons and frames for e.g. buttons or displays. The term "plastic material" is understood to mean a synthetic or semi-synthetic organic amorphous solid material; it may for instance be a thermoplastic or a thermosetting polymer.

As used herein, the term "comprising" or "comprises" is open-ended, and includes one or more stated features, elements, steps, components or functions but does not preclude the presence or addition of one or more other features, elements, steps, components, functions or groups thereof.

As used herein, the term "and/or" includes any and all combinations of one or more of the associated listed items. As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est", may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element is referred to as being "on," "coupled." or "connected" to another element, it can be directly on, coupled, or connected to the other element, or intervening elements may also be present. In contrast, when an element is referred to as being "directly on." "directly coupled," or "directly connected" to another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component region, layer or section without departing, from the teachings of the present invention.

Spatially relative terms, such as "beneath", "below", "bottom", "lower", "above", "top", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. Also, as used herein, "lateral" refers to a direction that is substantially orthogonal to a vertical direction.

Example embodiments of the present invention have been described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing.

The invention claimed is:

1. A method of producing a housing of a portable electronic device, the housing comprising at least two portions, the method comprising:

providing a first housing portion layer made from sheet metal, providing a second housing portion layer made from a plastic material comprising a synthetic or semi-synthetic organic amorphous solid material, forming a first housing portion from the first housing portion layer using a high speed forming process, and joining the first housing portion layer with the second housing portion layer.

2. The method according to claim 1, wherein forming the first housing portion comprises:
  driving the first housing portion layer into a die, the die having indentations and/or protrusions, with a surface of the first housing portion forming an external surface of the housing abutting the die.

3. The method according to claim 1, wherein joining the first housing portion layer with the second housing portion layer is performed after forming the first housing portion.

4. The method according to claim 1, wherein joining the first housing portion layer with the second housing portion layer is performed during forming of the first housing portion.

5. The method according to claim 1, wherein joining the first housing portion layer with the second housing portion layer is performed before forming of the first housing portion.

6. The method according to claim 1, wherein joining the first housing portion layer with the second housing portion layer includes any one of gluing, taping, use of a bonding agent, chemical bonding, or moulding.

7. The method according to claim 1, wherein the method further comprises:
  heating the second housing portion layer.

8. The method according to claim 1, wherein the method further comprises:
  providing the second housing portion layer with holes therein adapted for connecting a further housing portion of the portable electronic device.

9. The method according to claim 1, wherein the method further comprises:
  laser cutting through the first housing portion layer to provide openings in the first housing portion layer.

10. The method according to claim 1, wherein the first housing portion layer has a thickness of about 0.05 millimeters (mm) to about 1.0 mm.

11. The method according to claim 1, wherein the first housing portion layer made from sheet metal comprises two different metal layers.

12. The method according to claim 1, wherein the high speed forming process comprises an electromagnetic forming process.

13. The method according to claim 12, wherein forming the first housing portion further comprises:
  providing a driver plate made from metal, wherein the driver plate is separate from the first and second housing portion layers; and
  accelerating the driver plate during the electromagnetic forming process.

14. The method according to claim 13, wherein the driver plate is arranged next to the second housing portion layer during the forming of the first housing portion, and wherein accelerating the driver plate drives the second housing portion layer toward a die.

15. The method according to claim 13, wherein a surface of the driver plate is provided with indentations and/or protrusions.

16. The method according to claim 1, wherein the high speed forming process comprises an electro hydraulic forming process.

17. The method according to claim 16, wherein the electro hydraulic forming process comprises:
  evacuating a space formed between the first housing portion layer and a die.

18. A housing of a portable electronic device manufactured according to the method of claim 1.

* * * * *